United States Patent
Gupta et al.

(10) Patent No.: US 7,512,779 B2
(45) Date of Patent: Mar. 31, 2009

(54) APPARATUS, AND ASSOCIATED METHOD, FOR COMMUNICATING SIGNALING DATA IN SECURE FORM IN A SIGNALING NETWORK

(75) Inventors: Sudeep Gupta, Frisco, TX (US); Russell Cook, Garland, TX (US)

(73) Assignee: Alcatel Lucent, Paris (FR)

( * ) Notice: Subject to any disclaimer, the term of this patent is extended or adjusted under 35 U.S.C. 154(b) by 777 days.

(21) Appl. No.: 10/729,091

(22) Filed: Dec. 5, 2003

(65) Prior Publication Data
US 2004/0213410 A1 Oct. 28, 2004

Related U.S. Application Data

(60) Provisional application No. 60/464,468, filed on Apr. 22, 2003.

(51) Int. Cl.
*H04L 9/00* (2006.01)
(52) U.S. Cl. .................. 713/151; 380/255; 380/270; 380/283
(58) Field of Classification Search .......... 380/255, 380/283, 270; 713/151
See application file for complete search history.

(56) References Cited

U.S. PATENT DOCUMENTS

| 5,974,052 | A | * | 10/1999 | Johnson et al. ............. 370/467 |
| 6,081,600 | A | * | 6/2000 | Blanchard et al. ........... 380/255 |
| 7,165,175 | B1 | * | 1/2007 | Kollmyer et al. ............ 713/154 |

OTHER PUBLICATIONS

Lorenz, G. et al, Securing SS7 Telecommunications Networks, 2001, IEEE, pp. 1-6.*

* cited by examiner

*Primary Examiner*—Nasser G Moazzami
*Assistant Examiner*—Daniel L Hoang

(57) ABSTRACT

Apparatus, and an associated method, for communicating a signaling message, such as a message signaling unit, in secure form, even upon a communication path of an untrusted security level. The signaling message is applied to a signal transfer point. An encryption selector selects whether to encrypt the signaling message and, if so, which parts of the message to encrypt. If a portion of the signaling message encrypts the selected portion and causes the signaling message to be communicated upon a communication path to a destination. Once delivered to a trusted signal transfer point, the selected portion of the signaling message is decrypted, and the signaling message is delivered to the ultimate destination.

17 Claims, 3 Drawing Sheets

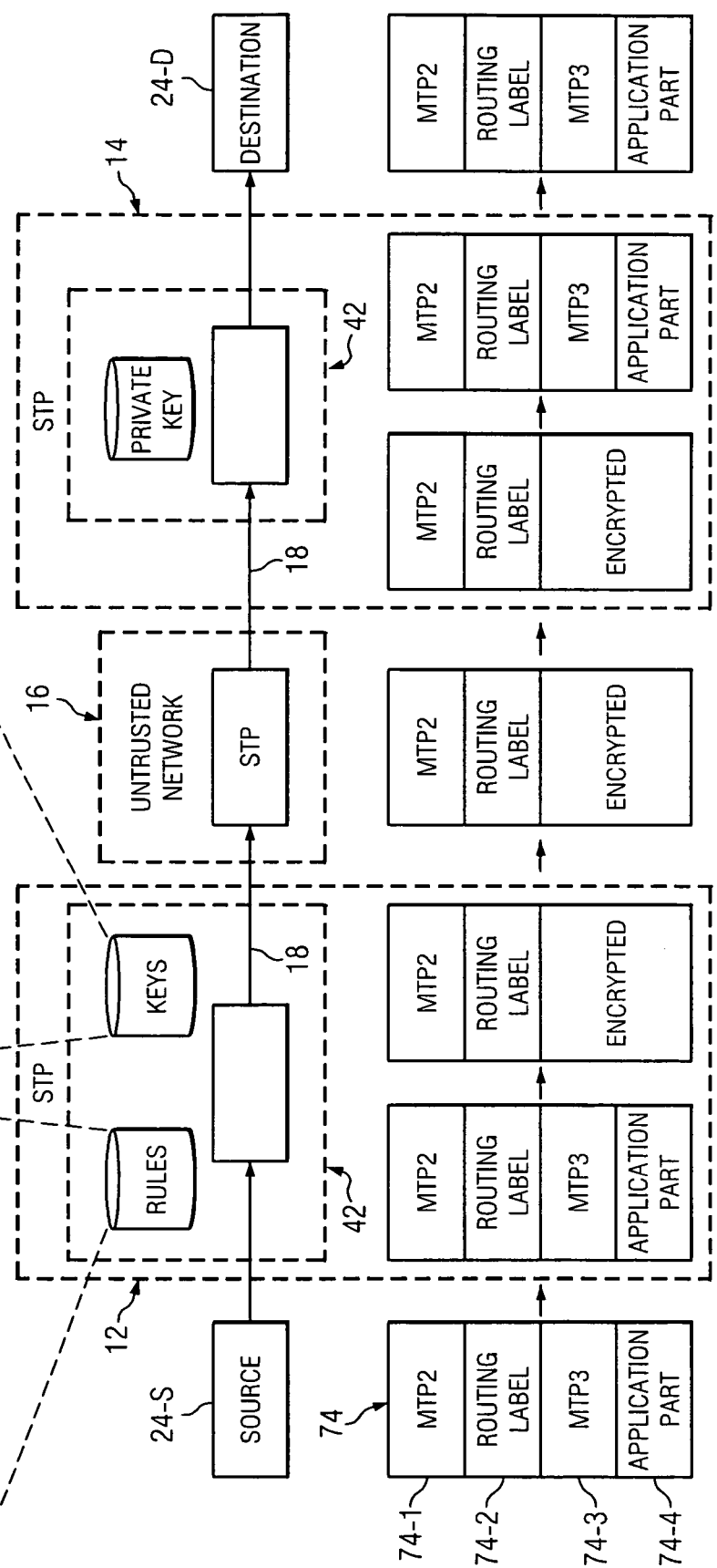

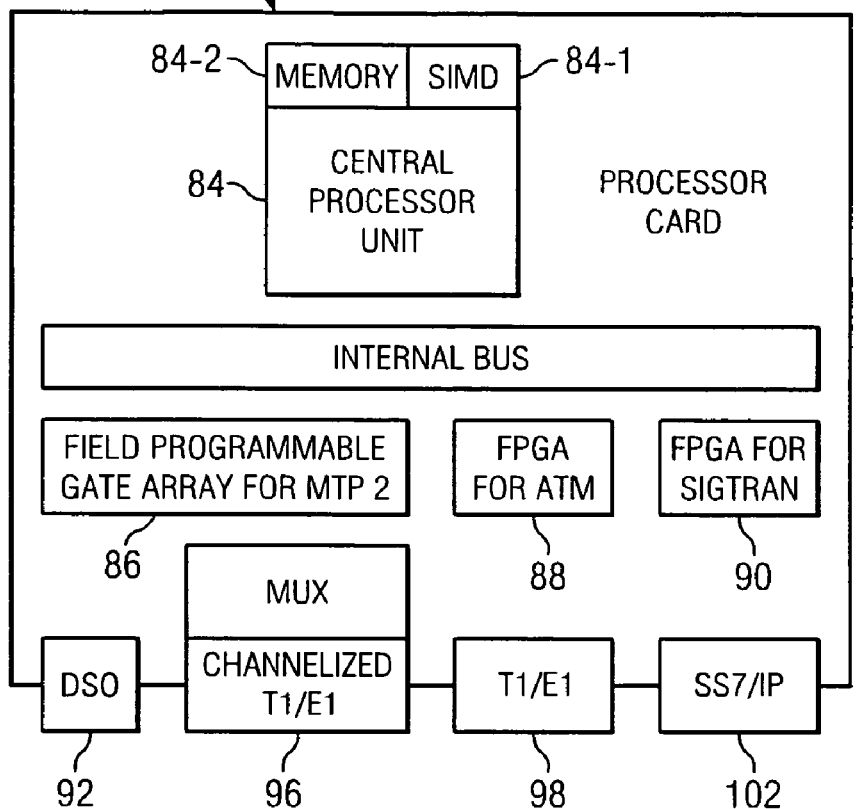
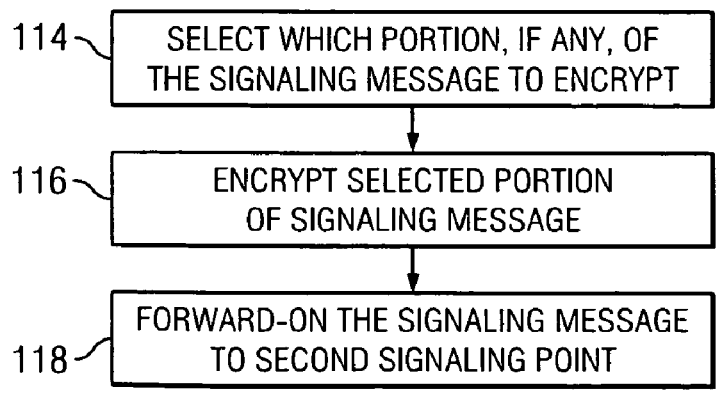

APPARATUS, AND ASSOCIATED METHOD, FOR COMMUNICATING SIGNALING DATA IN SECURE FORM IN A SIGNALING NETWORK

CROSS-REFERENCE TO RELATED APPLICATIONS

The present invention claims priority to U.S. Provisional Application Ser. No. 60/464,468 filed Apr. 22, 2003.

The present invention relates generally to a manner by which to communicate signaling data, such as an MSU (Message Signaling Unit) defined in an SS7-compatible signaling network, in a secure manner. More particularly, the present invention relates to apparatus, and an associated method, by which selectably to encrypt selected portions of selected signaling data to send the data in secure form through the signaling network by way of a communication path exhibiting an untrusted level of security.

A message signaling unit, or other signaling data message, is provided to a signal point. Based on indicia associated with the message, selection is made whether to encrypt a portion of the payload part of the message. The selected portion, if any, is encrypted, and the message is routed through the signaling network to another signal point. Encryption of the selected portion of the payload part of the message ensures that an untrusted party shall be unable to ascertain the informational content of the encrypted portion of the payload part. The encrypted portion of the message is thereby communicated in secure form. The header part of the message remains unencrypted, permitting routing of the message through the signaling network to be delivered to a trusted signaling point whereat decryption of the encrypted portion is performed.

BACKGROUND OF THE INVENTION

The need to communicate data is a necessary aspect of modern society. The availability of modern communication systems through which to communicate data is, therefore, regularly required by many people. Many different types of communication systems have been developed and deployed, through which to communicate data to effectuate many varied types of communication services.

At a minimum, a communication system includes a sending station and a receiving station, interconnected thereto-gether by way of a communication channel. Data is sourced, or otherwise provided to, the sending station and converted, if necessary, into a form to permit its communication upon the communication channel. The receiving station detects the data communicated upon the communication channel and operates to recover the informational content of the data.

A telephonic communication system is an exemplary type of communication system. Telephonic communication systems have been deployed to encompass a large part of the populated areas of the world. Through use of a telephonic communication system, telephonic communication of both voice and non-voice data is provided. The telephonic communication is effectuated by use of telephonic stations that are connected, in communication connectivity, with a telephonic network. Two-way communication of data is provided as the telephonic stations generally include circuitry capable of both sending and receiving data.

The telephonic station at which communications with another telephonic station are initiated is sometimes referred to as being a calling station or calling party. And, the telephonic station with which the telephonic communications are to be effectuated is sometimes referred to as being the called station or called party. Call set-up signaling is performed to form call connections through the telephonic network to form a communication path between the telephonic stations.

Signaling protocols and signaling network entities that operate upon the signaling messages comport to signaling standards pursuant to which a telephonic network is operable. One such signaling protocol, and a corresponding signaling network, is referred to as a signaling system seven (SS7) protocol and network. SS7 networks have been widely deployed and used.

Generally, an SS7 network forms a packet data network that provides for out-of-band signaling. SS7 Signaling of signal messages, i.e., signaling data, is performed pursuant to call set-up and call tear-down procedures pursuant to which advanced intelligent network (AIN) communication services are implemented. Additionally, SS7 signaling is performed to provide for routing of data traffic between interexchange carriers (IXCs) as well as to access databases at which database information is stored that is utilized to provide various communication services.

Amongst the entities that are defined in an SS7 network are signaling points that form, or include, switches that are referred to as signal transfer points (STPs). Signal transfer points of the SS7 network are interconnected by way of data links.

An SS7 network also typically includes additional entities including, for instance, signal switching points (SSPs) that operate, amongst other things, to route calls that are initiated by calling stations. Points of presence (POPs) form the calling and called stations forming data sources and data syncs of network traffic. The points of presence also provide alternate local telephonic carrier networks and interexchange carriers with access to a local access and transport area (LATA) associated with a particular signal transfer point. And, SS7 networks also typically include network databases (DBs).

SS7 signaling messages are sometimes routed upon communication paths through successive signal transfer points prior to delivery to a desired destination. The signaling messages are formatted pursuant to a packet formatting scheme to include a header part and a payload part. The header part of the message identifies at least to where the message is to be delivered.

The communication path upon which a message is transported to be delivered to a desired destination might not be secure. That is to say, an unauthorized party might be able to ascertain the informational part of a message during its communication along the communication path to the desired destination. As, sometimes, the informational content of the message is proprietary, the possibility that the security of the informational component of the message might be compromised must be precluded.

Existing schemes proposed by which better to provide for increased security of communications are variously inadequate or unworkable.

And, while encryption techniques are generally known, their application to SS7, or other, signaling network communications have generally not been possible due to encryption techniques and their associated processing requirements. As signaling data must be communicated in real-time or with only minimal delay, use of encryption techniques to improve the security of communication of signaling data has not been implemented.

As a continuing need exists to provide for secure-communication of signaling data, such as in an SS7 signaling network, any manner by which better to provide for secure communications upon a communication path that exhibits an untrusted level of security would be advantageous.

It is in light of this general information related to the communication of signaling messages in an SS7, or other, signaling network that the significant improvements of the present invention have evolved.

SUMMARY OF THE INVENTION

The present invention, accordingly, advantageously provides apparatus, and an associated method, by which to communicate signaling data, such as a message signaling unit (MSU) defined in an SS7-compatible signaling network, in a selected manner.

Through operation of an embodiment of the present invention, a manner is provided by which selectably to encrypt selected portions of selected signaling data to send the data in secure form to a trusted destination by way of a communication path that exhibits an untrusted level of security.

A signaling data message, such as the MSU, is originated at a message source and is provided to a signal point, such as a signal transfer point. Selection is made at the signal point whether to encrypt a portion of a payload part of the message. The selection is made responsive to indicia associated with the message. If selection is made to encrypt a selected portion of the payload part of the message, the selected portion is encrypted into encrypted form. And, thereafter, the message is transported to a destination by way of the signaling network. Even if the message is transported by way of an untrusted communication path, the security of the encrypted portion of the message is maintained as the encryption of the selected portion of the payload part of the message prevents an unauthorized party from obtaining the informational content of the encrypted portion.

The message is delivered to a trusted destination whereat the encrypted portion, if any, of the message is decrypted, to permit thereafter further operations to be performed upon the message.

In one aspect of the present invention, selection of whether to encrypt a portion of the message, and, if so, which portion of the message, is dependent upon the origination of the message. That is to say, the location at which the message is sourced determines whether, and which portions of, the message is encrypted. A calling party is thereby assured that the security of the portion of the message that is encrypted remains in secure form even when communicated by way of an untrusted communication path.

In another aspect of the present invention, selection of whether to encrypt a portion of the message and, if so, which portion, of the message to encrypt is made responsive to analysis of the destination of the message. If a message is determined to be directed to a particular destination, irrespective of its origination, a selected portion of the message is encrypted prior to its communication upon a communication path to the destination. Thereby, the destination is assured that any message routed thereto, even if transported upon a communication path that is of an untrusted security level, the destination is assured that the message portion that is encrypted is communicated in a secure manner.

A database is maintained at, or is accessed by, a signal point, such as a signal transfer point, to which a message is applied, prior to communication upon an untrusted communication path.

Selection is alternately, or additionally, selection of which, if any, portion of the message to encrypt, is based upon additional selection criteria. For instance, selection is, if desired, also dependent upon additional selection criteria such as to which signaling point, other than a particular destination, that the message is to be routed. And, selection is also made, if desired, to encrypt a portion of the signaling message on a per-application basis. That is to say, selection is made to encrypt all signaling messages of a certain message type.

The signaling point to which the signaling message is applied prior to its communication upon a potentially untrusted communication path has access to, or otherwise maintains, a rules-based database. The rules-based database is accessed to retrieve a rule that is used to select whether to encrypt a portion of the signaling message and, if so, which portion to encrypt. Responsive to the rule, selection is made whether to encrypt a portion of the signaling message or to communicate the signaling message in unencrypted form. The rules-based database is selectably updatable to permit alteration of the rules contained therein responsive, e.g., to changes in subscription information associated with service subscription in the communication network associated with the signaling network.

When selection is made to encrypt a portion of the signaling message, the signaling message is applied to an encryptor that encrypts the selected portion into encrypted form. The encryption performed by the encryptor utilizes, e.g., a public-key encryption scheme. When a public-key encryption scheme is utilized, a public-key encryption database is also maintained, or otherwise accessed, by the encryptor.

When encrypted and communicated through the signaling network to a destination, the encrypted portion of the message is secure and private. The message is delivered to a trusted destination whereat the portion, if any, of the signaling message is decrypted. Decryption of the encrypted portion of the message is carried out in a manner analogous to, but reverse of, the encryption process by which the portion of the signal line message is encrypted.

When implemented in an SS7 signaling network, portions of a payload part of an MSU is selectably encrypted according to a rules-based selection process. MTP3 portions, AP portions, both, neither, or other portions of the payload part of the MSU are encrypted according to selection responsive to the rules-based selection procedure.

In one implementation, encryption is carried out by a single instruction multiple data (SIMD) instruction unit of a processing device that is capable of operation independent of a floating point unit that is used for other operations. Real-time, or near-real-time processing upon the MSU is carried out so as not materially to delay the communication of the MSU.

In these and other aspects, therefore, apparatus, and an associated method, is provided for a signaling network in which signaling messages are communicated between signaling points thereof. At least portions of a signaling message communicated by way of a first selected signaling point to at least a second selected signaling point are selectably encoded. An encryption selector is operable responsive to delivery of the signaling message at the first selected signaling point. The encryption selector selects which, if any, portion of the signaling message is to be encrypted. An encryptor is adapted to receive indications of the selection made by the encryption selector. The encryptor selectably encrypts the portion of the signaling message selected by the encryption selector to be encrypted. The signaling message thereafter is forwarded on to the second selected signaling point.

A more complete appreciation of the present invention and the scope thereof can be obtained from the accompanying drawings that are briefly summarized below, the following detailed description of the presently-preferred embodiments of the present invention, and the appended claims.

BRIEF DESCRIPTION OF THE DRAWINGS

FIG. 2 illustrates a functional block diagram of portions of the signaling network shown in FIG. 1 showing exemplary message flow of an exemplary message communicated pursuant to operation of an embodiment of the present invention forming part of the signaling network shown in FIG. 1.

FIG. 3 illustrates the architecture of an exemplary processing device utilized at a signal transfer point at which encryption, or decryption, operations are performed pursuant to an embodiment of the present invention.

FIG. 4 illustrates a method flow diagram listing the method steps of the method of operation of an embodiment of the present invention.

DETAILED DESCRIPTION

Figure 1:
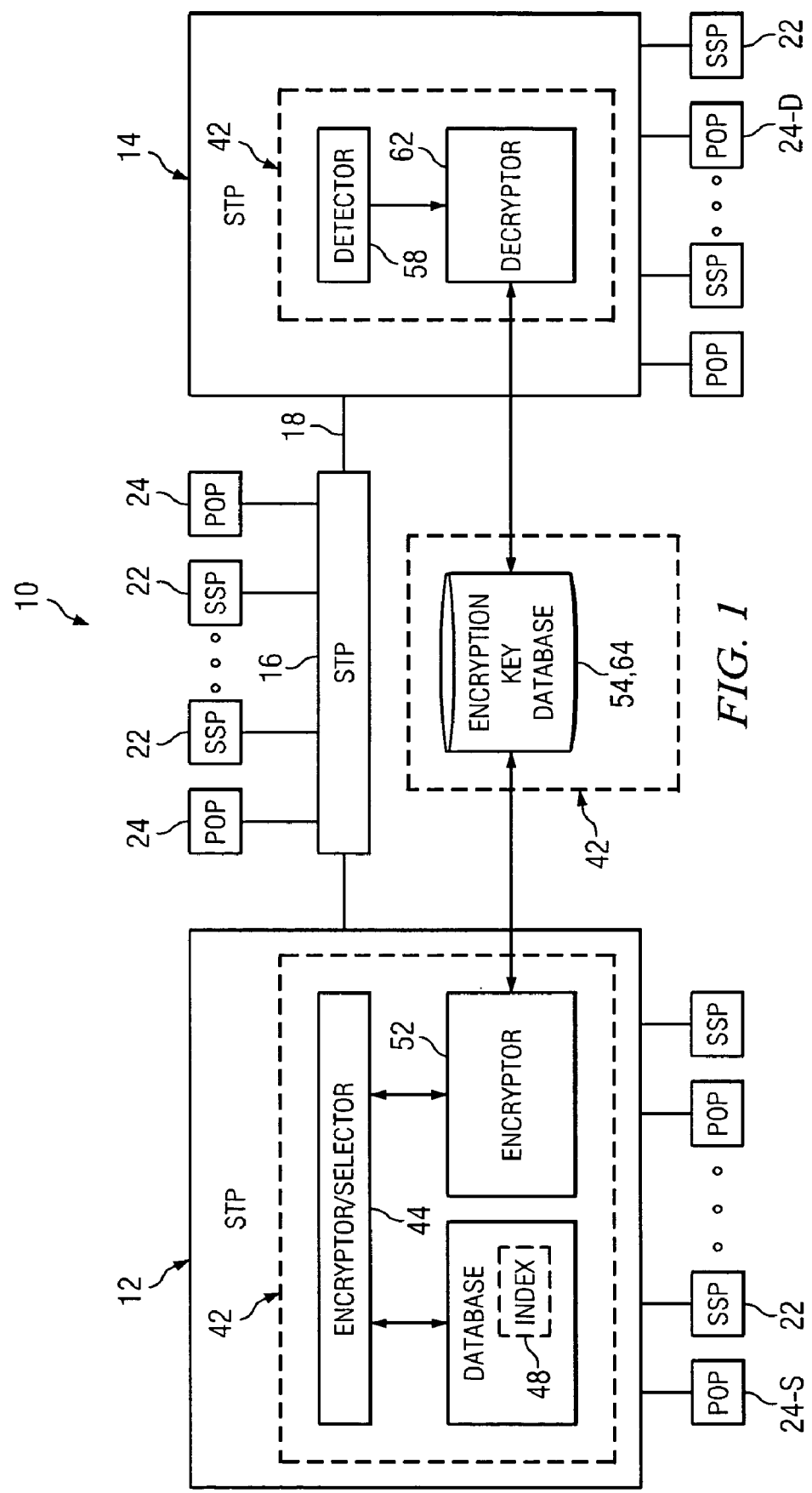
FIG. 1 illustrates a functional block diagram of a signaling network that includes an embodiment of the present invention as a portion thereof.

Referring first to FIG. 1, an exemplary signaling network, shown generally at 10, that is utilized pursuant to telephonic communications in modern telephonic communication systems. The signaling network 10 is operable in conformity with the standardized protocols of an SS7 (Signaling System 7) operating standard. The SS7 network forming the signaling network forms a packet data network that provides out-of-band signaling. Signaling is generated in the SS7 network to perform various call-related functions, such as to perform call set-up procedures and call tear-down procedures. Additionally, signaling is performed in the SS7 network pursuant to various advanced intelligent network (AIN) services to route communication traffic data to interexchange carriers (IXEs) and to provide selected communication services.

The SS7 network shown in the Figure is exemplary, here showing functional entities arranged and connected in an exemplary manner. In an actual implementation, an SS7 network is typically installed over a large area and includes a large number of functional entities positioned throughout the large geographical area.

Here, the signaling network is shown to include a plurality of signaling points, including signal transfer points 12, 14, and 16. The signal transfer points 12, 14, and 16 are interconnected by way of data links 18 that form communication paths permitting communication of signaling messages therebetween. Once connected, the signal transfer points define a core network. A plurality of signal switching points (SSPs) 22 are coupled to each of the signal transfer points. While each of the signal switching points, e.g., implemented as telephonic-network, central offices, are shown to be connected to an associated signal transfer point, the connections are, alternately, indirect. Each of the signal transfer points, configured in the arrangement shown in the Figure, serve a separate LATA (Local Access and Transport Area). A plurality of points of presence (POPs) 24 are also shown, coupled to the signal transfer points. The POPs are representative, e.g., of data sources and data sinks of network traffic. Also, while not separately shown, the SSPs 22 are connected, directly or indirectly, with one or more POPs.

During signaling operations, a signaling message originated, for instance, at a POP 24, identified at 24-S, connected to one of the signal transfer points is to be delivered to another POP connected to the signaling transfer point 14, identified at 24-D. The communication path through which the signaling message is routed includes the signal transfer point 16 as well as the signal transfer point 12 and 14. The signal transfer point 16 forms an intermediary node through which the signaling message is routed, but which does not otherwise operate upon the message.

The signal transfer point 16 is here also an untrusted entity, i.e., a node of unreliable security. When untrusted, the source and destination nodes, here endpoints formed of the two POPs 24-S and 24-D, are unable to be certain that the signaling message is communicated in secure fashion. As a signaling message potentially includes information that should remain secure, its communication through a communication path of untrusted levels of security leave the signaling message at risk of security compromise.

Pursuant to an embodiment of the present invention, a manner is provided by which selectively to encrypt selected portions of the signaling message so that the informational content of the message is unascertainable as the message is routed through the network through signaling points or nodes of untrusted levels of security.

The signal transfer point 12 includes apparatus 42 of an embodiment of the present invention. The apparatus 42 is functionally represented and is implementable in any desired manner, such as by algorithms executable by processing circuitry. When implemented in this manner, the processing circuitry is of processing capabilities permitting the operations required to be performed by the elements of the apparatus to be carried out with minimal delay so that the messages transported during operation of the signaling network continue to be transported in a real-time or near-real-time manner.

When a signaling message, here a message signaling unit (MSU) is formed at a data source 24, the message is routed to the signal transfer point, here the signal transfer point 12, associated therewith. The values of the message signaling unit are provided to the apparatus. The apparatus includes an encryption selector 44 that operates to select whether to encrypt a portion of the message signaling unit. And, if so, the encryption selector selects which portion, or portions, of the message signaling unit to encrypt.

Selection is made by the encryption selector pursuant to a rule. Here, a rules-based database 46 is maintained, either at the signal transfer point, or elsewhere, accessible to the signal transfer point. The database includes an index 48 that identifies which portions, if any, of a message signaling unit to encrypt. Encryption is selected responsive, for instance, to the location of origination of the signaling message, the ultimate destination of the signaling message, the application pursuant to which the message is generated, or any other selected criteria. The rules contained at the index 48 of the database are indexed together with some indicia associated with the message.

The selection made by the encryption selector is provided to an encryptor 52. The message signaling unit forming the signaling message is also applied to the encryptor. The encryptor operates to encrypt the selected portion, if any, of the message signaling unit to place the selected portion in encrypted form. And, once operations, if any, performed by the encryptor are completed, the message is routed through the signaling network to be delivered to its destination, here by way of the signal transfer point 16 and the signal transfer point 14.

The encryptions performed by the encryptor are made pursuant to a public-key/private-key encryption scheme. The public-key used by the encryptor is retrieved from a public-key database 54, maintained at the signal transfer point 12, or is otherwise accessible thereto. In one implementation, the encryption key database 54 is a publicly maintained and accessible database.

The signal transfer point 14 includes further apparatus 42 of an embodiment of the present invention. The message signaling unit, routed through the signaling network and delivered to the signal transfer point 14, is applied to the apparatus 42. The apparatus 42 embodied at the signal transfer point 14 includes a detector 58 that detects whether a portion of the message delivered to the signal transfer point has been encrypted. If so, the message, or at least the encrypted portions thereof, are provided to a decryptor 62 that operates to decrypt the encrypted data provided thereto. The decryption is performed in a manner analogous to the encryption performed by the encryptor 52. And, namely, here, decryption is performed through use of a decryption key pursuant to a public-key/private-key encryption-decryption scheme. An encryption key database 64 is maintained at, or is otherwise accessible to, the decryptor to permit the decryption operations to be performed. Once decrypted, the signaling message is forwarded on to an ultimate destination, here 24-D.

Because of the encryption of the data part prior to its communication through the signaling network, an authorized party capable of accessing the message, during its communication upon an untrusted communication path through the signaling network, is unable to ascertain the informational content of the message. Encryption and decryption performed at trusted entities, here the signal transfer points 12 and 14, provide the mechanism by which to secure the message and to permit the informational content thereof to be recovered.

FIG. 2 again illustrates portions of the signaling network shown in FIG. 1. Namely, the signal transfer points 12, 14, and 16, together with the data links 18 connecting the signal transfer points together are again illustrated. Here, in the exemplary implementation, the signal transfer points form signaling-server signal transfer points. And, the source and destination entities 24-S and 24-D are again shown. A message signaling unit 72 is formed at the source 24-S. The message 74 is formed of a header part and a payload part. Here, the exemplary payload part of the message includes four portions 74-1, 74-2, 74-3, and 74-4. The part 74-1 forms an MTP2 part; the part 74-2 forms a routing label part; the part 74-3 forms an MTP3 part; and the part 74-4 forms an application part.

The message is provided to the signal transfer point 12 whereat the apparatus 42 operates to select whether, and, if so, which part, of the message to encrypt. Access is made to the rules-based database 46 to make the selection of whether to encrypt a portion of the message. Here, in the illustrated example, the rule contained in the database indexes the destination of the message together with instructions to encrypt the part 74-3 and 74-4 of the message. Upon selection of the portions of the message to encrypt, the encryptor encrypts the selected portions through use of a public-key, here the public-key B stored at the encryptor key database 54. Once encrypted, the message is routed through the signaling network to the signal transfer point 16. When delivered to the signal transfer point 16, the detector detects the message, and the encrypted portions of the message are decrypted. The message is then forwarded on to the destination 24-D FIG. 3 illustrates the architecture of a processor card, shown generally at 82, embodied at a signal transfer point, and utilized to perform the functions provided by the apparatus 42 pursuant to an embodiment of the present invention.

The processor card includes a processor 84, here a CPU having an integrated SIMD (single instruction multiple data) unit. The processor provides a single instruction multiple data (SIMD) instruction unit 84-1 that is suitable for floating point operations that require matrix-based transformations utilized pursuant to operations carried out by any of the various elements of the apparatus 42 and a memory 84-2. Additional entities embodied at the processor card include a field programmable gate arrary (FPGA) 86 for MTP2, a field programmable gate array (FPGA) 88 for ATM, a field programmable gate array (FPGA) 90 for sigtran, a DSO 92, a multiplexer (MUX) 96, a TI/EI 88, and an SS7/IP connector 102.

FIG. 4 illustrates a method flow diagram, shown generally at 112, representative of the method of operation of an embodiment of the present invention. The method 112 selectably encodes at least portions of a signaling message communicated by way of a first selected signaling point to at least a second selected signaling point.

First, and as indicated by the block 114, selection is made, responsive to delivery of the signaling message to the first selected signaling point, of which portion, if any, of the signaling message to encrypt.

Then, and as indicated by the block 116, responsive to selection of encryption of a selected portion of the signaling message, the selected portion is encrypted. And, as indicated by the block 118, the signaling message is forwarded on to the second signaling point.

Because any portion of the payload part of the message is encrypted, the encrypted portion of the message is communicated in secure form, even by way of a communication path of an untrusted security level.

The previous descriptions are of preferred examples for implementing the invention, and the scope of the invention should not necessarily be limited by this description. The scope of the present invention is defined by the following claims.

The invention claimed is:

1. In a signaling network in which signaling messages are communicated between signaling points of the signaling network, an improvement of apparatus for selectably encoding at least portions of a signaling message communicated by way of a first selected signal point to at least a second selected signal point, said apparatus comprising:

an encryption selector operable responsive to delivery of the signaling message at the first selected signal point, said encryption selector for selecting which, if any, portion of the signaling message to encrypt;

an encryptor adapted to receive indications of the signaling message and to receive indications of selection made by said encryption selector, said encryptor selectably for encrypting the portion of the signaling message selected by said encryption selector to be encrypted, the signaling message thereafter to be forwarded on to the second selected signaling point; and an encryption selection database accessible by said encryption selector, said encryption selection database maintaining an index that comprises indicia associated with an originating node that originates the signaling message, and with an identifier that identifies the second selected signal point to which the signaling message is to be forwarded, wherein at least one of the originating node and the identifier are indexed together with values representative of which, if any, portion of the signaling message is to be encrypted;

wherein the signaling message comprises a payload part that said encryptor selectably encrypts, said payload comprises at least a selected one of an MTP3 part and an AP part, and wherein said encryption selector selects, if any, at least one of the MTP3 part and the AP part.

2. The apparatus of claim 1 wherein the signaling network comprises an SS7 signaling network, wherein the first selected signal point comprises a first signaling transfer point and wherein said encryption selector and said encryptor are embodied at the first signaling transfer point.

3. The apparatus of claim 1 wherein said encryption selection database maintains an index of which portion, if any, of the signaling message is to be encrypted, and wherein said encryption selector accesses the index maintained at said encryption selection database pursuant to the selection of which, if any, portion of the signaling message to encrypt.

4. The apparatus of claim 1 wherein the signaling message comprises a header part and said payload part and wherein the portion, if any, of the signaling message selected by said encryption selector to be encrypted comprises a selected portion of the payload part.

5. The apparatus of claim 4 wherein the signaling network comprises an SS7 signaling network, wherein the signaling message comprises a message signaling unit, and the payload part of the signaling message comprises a portion of the message signaling unit.

6. The apparatus of claim 1 wherein said encryptor encrypts the portion of the signaling message pursuant to a public-key encryption scheme.

7. The apparatus of claim 6 wherein the second selected signal point to which the signaling message is to be forwarded is identified by an identifier and wherein the public-key encryption scheme used by said encryptor encrypts the portion, if any, of the signaling message using a public encryption key associated with the identifier that identifies the second selected signal point.

8. The apparatus of claim 7 wherein said apparatus further comprises an encryption key database accessible by said encryptor, said encryption key database maintaining an index that indexes together the public encryption key and the identifier associated therewith.

9. The apparatus of claim 8 wherein said encryptor accesses said encryption key database pursuant to encryption of the portion of the signaling message selected by said encryption selector to access the encryption key associated with the second selected signal point.

10. In the signaling network of claim 1 further including apparatus for selectably decoding the signaling message, said apparatus comprising:
a detector adapted to receive indications of the signaling message, said detector for detecting which, if any, part of the signaling message is encrypted; and
a de-encryptor adapted to receive indications of detections made by said detector and to receive indications of the signaling message sent to the second selected signal point, said de-encryptor selectably for de-encrypting the encrypted portion, if any, of the signaling message.

11. The apparatus of claim 10 wherein the signaling message is delivered to said detector and to said de-encryptor by way of an untrusted communication path.

12. The apparatus of claim 10 wherein de-encryption performed by said de-encryptor utilizes an encryption key to de-encrypt the encrypted portion, if any, of the signaling message.

13. In a method of communicating in a signaling network in which signaling messages are communicated between signaling points of the signal network, an improvement of a method for selectably encoding at least portions of a signaling message communicated by way of a first selected signal point to at least a second selected signal point, said method for selectably encoding comprising:
selecting, responsive to delivery of the signaling message at the first selected signal point, which portion, if any, of the signaling message to encrypt;
selectably encrypting, responsive to selection made during said operation of selecting, the portion, if any, of the signaling message; and
maintaining an index that comprises indicia associated with an originating node that originates the signaling message, and with an identifier that identifies the second selected signal point to which the signaling message is to be forwarded, wherein at least one of the originating node and the identifier are indexed together with values representative of which, if any, portion of the signaling message is to be encrypted, wherein the signaling message comprises a payload part that is selectably encrypted, said payload comprises at least a selected one of an MTP3 part and an AP part, and wherein said encryption selector selects, if any, at least one of the MTP3 part and the AP part; and thereafter
forwarding on the signaling message to the second signal point.

14. The method of claim 13 wherein the signaling network comprises an SS7 signaling network, wherein the first selected signal point comprises a first signaling transfer point, and wherein said operations of selecting and selectably encrypting are performed at the first signal transfer point.

15. The method of claim 13 further comprising the operations of delivering the signaling message to the second signal point, determining whether any portion of the signaling message is encrypted, and decrypting the portion of the signaling message that is determined during said operation of determining to be encrypted.

16. The method of claim 15 wherein said operation of forwarding is performed by way of a communication path of an untrusted level of security.

17. The method of claim 15 wherein said operations of encrypting and decrypting are performed pursuant to a public-private key encryption and decryption scheme.

* * * * *